United States Patent [19]

Contursi et al.

[11] Patent Number: 5,219,539
[45] Date of Patent: Jun. 15, 1993

[54] PROCESS FOR PREPARING FINE ALUMINUM NITRIDE POWDER FROM AN INORGANIC FLOCCULANT

[75] Inventors: Luigi Contursi, Lugo; Giovanni Bezzi, Bagnacavallo; Giordano Beghelli, Bologna, all of Italy

[73] Assignee: Temav S.p.A., Venezia-Porto Marghera, Italy

[21] Appl. No.: 775,617

[22] Filed: Oct. 15, 1991

[30] Foreign Application Priority Data

Oct. 19, 1990 [IT] Italy ................ 21811 A/90

[51] Int. Cl.$^5$ ............................ C01B 21/072
[52] U.S. Cl. ................................... 423/412
[58] Field of Search .......................... 423/412

[56] References Cited

U.S. PATENT DOCUMENTS 4,643,859  2/1987  Mitomo et al.
4,985,225  1/1991  Hashimoto et al. ........... 423/412

FOREIGN PATENT DOCUMENTS 0272493  6/1988  European Pat. Off.
3828598  5/1989  Fed. Rep. of Germany.
293308  12/1990  Japan ........................... 423/412

OTHER PUBLICATIONS

Patent Abstracts of Japan, vol. 12, No. 501 (C-556) (3348) Dec. 27, 1988, & JP-A-63 210002, Aug. 31, 1988, N. Hashimoto, "Production of Aluminum Nitride Powder".

*Primary Examiner*—Wayne Langel
*Attorney, Agent, or Firm*—Oblon, Spivak, McClelland, Maier & Neustadt

[57] ABSTRACT

A process for preparing fine aluminium nitride (AlN) powder is described using an inorganic flocculant based on polyaluminium chloride (PAC) having the following structural formula:

$$Al_n(OH)_mCl_{3n-m}$$

where n and m are positive whole numbers and n is greater than m/3.

3 Claims, No Drawings

PROCESS FOR PREPARING FINE ALUMINUM NITRIDE POWDER FROM AN INORGANIC FLOCCULANT

This invention relates to a process for preparing fine aluminium nitride powder.

Aluminium nitride (AlN) has good chemical stability and high thermal conductivity.

These characteristics make it suitable both as a functional ceramic (electronic circuit support) and as a structural ceramic (components subjected to high temperature and/or aggressive environments).

AlN ceramics are prepared from the powder, which is suitably shaped and sintered.

The characteristics of the sintered product depend on the purity and grain size of the AlN powder.

This can be prepared by various methods:

direct synthesis from Al metal and $N_2$;

gaseous-phase nitridation of a volatile Al compound with $N_2$ and/or $NH_3$;

carbothermal reduction and nitridation of a mixture of $Al_2O_3 + C$ at a temperature of between 1600° and 1900° C. in an $N_2$ atmosphere.

The first method (direct synthesis) results in incomplete formation of the nitride, while the second (gaseous-phase nitridation) has a high production cost. The drawbacks of the two stated methods can be at least partly overcome by using the latter method.

This method is improved by chemical preparation of the $Al_2O_3 + C$ mixture, which enables purer AlN powder of finer particle size to be obtained although operating at a temperature which is some hundreds of degrees lower. The object of the preparation is to obtain the two reagents with submicronic particle size and intimately mixed together.

One example of a chemical method of recent application for preparing the $Al_2O_3 + C$ mixture is based on the hydrolysis and precipitation by ammonia of an aluminium alkoxide (aluminium isopropylate) in alcoholic suspension in which carbon powder has been previously dispersed (see U.S. Pat. No. 4,643,859).

We have now found a process based on a different chemical method for obtaining the $Al_2O_3 + C$ mixture which is much simpler than that of the cited U.S. patent, while enabling very pure AlN powder of small particle size to be obtained.

The process of the present invention for preparing fine aluminium nitride (AlN) powder is characterised by using, in aqueous solution, an inorganic flocculant based on polyaluminium chloride (PAC) having the following structural formula:

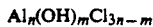

$$Al_n(OH)_m Cl_{3n-m}$$

where n and m are positive whole numbers, n being greater than m/3, and comprising the following stages:
a) dispersing carbon powder in the solution containing a polyaluminium chloride;
b) drying the resultant suspension;
c) carbothermally reducing and nitriding the obtained powder at a temperature of between 1350° and 1650° C. for a time varying from 1 to 24 hours in an atmosphere containing nitrogen, to obtain powder containing aluminium nitride;
d) eliminating the carbon from said powder by calcining at a temperature of between 600° and 700° C. for a time of between 1 and 7 hours in an atmosphere containing oxygen.

The polyaluminium chloride should have a basicity expressed in percentage $(m/3n \times 100)$ of between 30 and 83%.

The polyaluminium chloride-based flocculant can be prepared by attacking an aluminium oxide with concentrated hydrochloric acid. For example 2 parts by weight of HCl (35 wt. %) and 1 part by weight of aluminium hydroxide $(Al_2O_3.3H_2O)$ can be reacted by heating them in a pressure vessel to at least 160° C. for 2 hours under agitation at a pressure of about 6 atm.

Consequently to the dispersion of the carbon powder in an aqueous solution of PAC, a stable carbon suspension is obtained; said carbon is then homogeneously mixed to the aluminium oxide hydrate, generated by the suspension drying.

The carbon powder dispersed in the inorganic flocculant should preferably have a particle size of less than 0.1 μm.

The carbon quantity added is such that the atomic Al/C ratio is less than the stoichiometric for the reaction

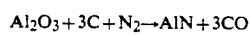

$$Al_2O_3 + 3C + N_2 \rightarrow AlN + 3CO$$

The atomic Al/C ratio is preferably between 2/3 and 2/5 and more preferably 2/4.

More particularly, with regard to stage b), the resultant suspension could be evaporated by boiling at atmospheric pressure and then calcined at about 300° C. or, to obtain greater chlorine elimination, heated to about 850° C. in an inert atmosphere.

The powder obtained can then be introduced (stage c) into a tubular chamber furnace to form the AlN.

The powder resulting from the thermal carboreduction-nitridation treatment, if carried out under optimum process conditions, can reach 96–98% by weight of AlN and comprise a single XRD-determinable crystalline phase consisting of AlN, with SEM analysis showing a grain size of around 0.5 μm.

Some examples are given hereinafter to better illustrate the invention, but must not be considered as limitative of the invention itself.

EXAMPLE 1

The inorganic flocculant used is a polyaluminium chloride (PAC) having the aforegoing structural formula, with an atomic Al/Cl ratio ≈ 0.6 (n/3−m ~ 0.6) and an aluminium content of about 95 g/kg.

8.7 g of carbon powder are added to 100 g of aqueous inorganic flocculant. The required atomic Al/C ratio is 2/4.

The carbon is dispersed by ultrasound for 10 minutes.

The resultant dispersion is dried by boiling at atmospheric pressure followed by heating to 200° C. The resultant weight is 43 g.

10 g of the powder obtained are placed in a graphite tray. This is introduced into a furnace with a tubular aluminium chamber of inner diameter 47 mm.

Heating is adjusted to a temperature increase of 500° C./h with a retention time at 1550° C. of 6 hours. During heating, an $N_2$ flow of 60 Nl/h is maintained within the reaction chamber.

After cooling, the resultant powder is oxidized in air at 650° C. for 6 hours.

Chemical analysis of the final powder gave the following results: $N_2=32.9\%$; $Al=65.2\%$; $O_2=1.1\%$; $C=0.07\%$ (percentages by weight).

XRD (X-ray diffraction) analysis indicates the presence of a single crystalline phase corresponding to AlN.

SEM (scanning electronic microscope) analysis shows that the constituent grains of the powder have a size of about 0.5 μm, are of spheroidal shape and are weakly attached to each other.

EXAMPLES 2-6

Carbonitridation tests were carried out for times of 1, 2, 3, 4 and 6 hours on respective samples of the mixture prepared in accordance with Example 1.

The final carbon thermal oxidation treatment was identical for all samples, namely 650° C. for 6 hours in air.

Nitrogen content and XRD analysis results are given in Table 1.

TABLE 1

| Example | Reaction time (h) | $N_2$ content (% weight) | Crystalline phases by XRD |
| --- | --- | --- | --- |
| 2 | 1 | 22.7 | $\alpha$-$Al_2O_3$, AlN |
| 3 | 2 | 30.2 | $\alpha$-$Al_2O_3$, AlN |
| 4 | 3 | 32.7 | traces of $\alpha$-$Al_2O_3$, Aln |
| 5 | 4 | 32.8 | AlN |
| 6 | 6 | 33.0 | AlN |

EXAMPLES 7-10 (comparative)

34.8 g of the same carbon powder used in the preceding examples were added to 112 g of $Al(OH)_3$. The required Al/C ratio was 2/4. The powders were mixed in a ball mill for 2 hours.

Samples of the resultant mixture were treated in a furnace at 1550° C. in $N_2$ flowing at 60 Nl/h for a time of 1, 3, 4 and 6 hours respectively.

The final carbon thermal oxidation treatment was identical for all samples, namely 650° C. for 6 hours in air.

Nitrogen content and XRD analysis results are given in Table 2.

TABLE 2

| Example comparative | Reaction time (h) | $N_2$ content (% weight) | Crystalline phases by XRD |
| --- | --- | --- | --- |
| 7 | 1 | 19.2 | $\alpha$-$Al_2O_3$, AlN |
| 8 | 3 | 27.6 | $\alpha$-$Al_2O_3$, AlN |
| 9 | 4 | 27.2 | $\alpha$-$Al_2O_3$, AlN |
| 10 | 6 | 30.0 | $\alpha$-$Al_2O_3$, AlN |

What is claimed is:

1. A process for preparing fine aluminum nitride (AlN) powder from an inorganic flocculant, comprising the steps
   a) dispersing carbon powder in an aqueous solution containing a polyaluminum chloride (PAC) having the following structural formula $$Al_n(OH)_m Cl_{3n-m}$$

where n and m are positive whole numbers, n being greater than m/3;
   b) drying the resultant suspension, to obtain a mixed powder;
   c) carbothermally reducing and nitriding the obtained mixed powder at a temperature of between 1350° and 1650° C. for a time varying from 1 to 24 hours in an atmosphere containing nitrogen, to obtain a powder containing aluminum nitride;
   d) eliminating the carbon from said powder containing aluminum nitride by calcining at a temperature of between 600° and 700° C. for a time of between 1 and 7 hours in an atmosphere containing oxygen.

2. A process as claimed in claim 1, wherein the polyaluminum chloride (PAC) has a basicity expressed in percentage (m/3n×100) of between 30 and 83%.

3. A process as claimed in claim 1, wherein the carbon powder dispersed in the inorganic flocculant has a grain size of less than 0.1 μm.

* * * * *